United States Patent
Rovik et al.

(10) Patent No.: US 8,818,697 B2
(45) Date of Patent: Aug. 26, 2014

(54) VEHICLES FOR COMMUNICATING VEHICLE PARAMETERS TO A NETWORKED SERVER

(75) Inventors: Christopher Lee Rovik, Canton, MI (US); Charan S. Lota, Canton, MI (US); Donald Anthony Restauri, III, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 170 days.

(21) Appl. No.: 13/411,930

(22) Filed: Mar. 5, 2012

(65) Prior Publication Data

US 2013/0231854 A1    Sep. 5, 2013

(51) Int. Cl.
| | |
|---|---|
| *G06G 7/76* | (2006.01) |
| *G07C 5/08* | (2006.01) |
| *B60R 16/023* | (2006.01) |
| *G08G 1/00* | (2006.01) |

(52) U.S. Cl.
CPC .............. *B60R 16/0236* (2013.01); *G08G 1/20* (2013.01); *G07C 5/0841* (2013.01)
USPC ........ 701/123; 701/29.3; 701/29.6; 701/32.1; 701/33.4

(58) Field of Classification Search
USPC .............. 701/123, 29.3, 537, 540, 29.6, 32.1, 701/33.4, 34.2
See application file for complete search history.

(56) References Cited

U.S. PATENT DOCUMENTS

| 7,561,054 B2 | 7/2009 | Raz et al. |
|---|---|---|
| 7,769,499 B2 | 8/2010 | McQuade et al. |
| 2002/0161496 A1* | 10/2002 | Yamaki ............................. 701/33 |
| 2007/0173993 A1* | 7/2007 | Nielsen et al. ................... 701/35 |
| 2007/0262855 A1* | 11/2007 | Zuta et al. ....................... 340/439 |
| 2008/0255722 A1* | 10/2008 | McClellan et al. .............. 701/35 |
| 2008/0270519 A1* | 10/2008 | Ekdahl et al. .................... 701/35 |

(Continued)

FOREIGN PATENT DOCUMENTS

| JP | 2003208696 | 7/2003 |
|---|---|---|
| WO | WO 2011043111 A1 * | 4/2011 |

OTHER PUBLICATIONS

Garmin, nuvi 1100/1200/1300/1400 series owner's manual, Jan. 2011, Garmin Ltd, Part No. 190-010401-00 Rev. F, pp. a-iv, 15 and 29-31.*

(Continued)

*Primary Examiner* — Helal A Algahaim
*Assistant Examiner* — Dale W Hilgendorf
(74) *Attorney, Agent, or Firm* — Dinsmore & Shohl LLP

(57) ABSTRACT

A vehicle having a driver statistic system for interfacing with a network includes a wheel speed sensor, an engine control unit, network interface hardware for communicating with a network, and an electronic control unit communicatively coupled therebetween. The electronic control unit includes a processor and memory storing a computer readable and executable instruction set. When the instruction set is executed by the processor, the electronic control unit processes sensor signals received from the wheel speed sensor and the engine control unit to determine fuel consumption of the vehicle. The electronic control unit transmits a vehicle status signal to the network interface hardware, where the vehicle status signal is indicative of the fuel consumption of the vehicle. The network interface hardware transmits the vehicle status signal to the network. The network interface hardware further receives a vehicle performance signal from the network indicative of a driver performance ranking.

18 Claims, 7 Drawing Sheets

(56) References Cited

U.S. PATENT DOCUMENTS

| | | |
|---|---|---|
| 2009/0091439 A1 | 4/2009 | Sekiyama et al. |
| 2010/0152960 A1 | 6/2010 | Huber et al. |
| 2010/0185359 A1 | 7/2010 | Tauchi et al. |
| 2010/0191703 A1* | 7/2010 | Masson et al. ............... 707/621 |
| 2011/0125691 A1* | 5/2011 | Bernard et al. ............... 706/46 |
| 2011/0128752 A1 | 6/2011 | Herbers et al. |
| 2011/0184784 A1 | 7/2011 | Rudow et al. |
| 2011/0258044 A1* | 10/2011 | Kargupta ................... 705/14.49 |
| 2012/0143484 A1* | 6/2012 | Sawada ......................... 701/123 |
| 2012/0197517 A1* | 8/2012 | Sengoku et al. .............. 701/123 |

OTHER PUBLICATIONS

Final Office Action mailed Jan. 15, 2014 in U.S. Appl. No. 13/500,865.

* cited by examiner

VEHICLES FOR COMMUNICATING VEHICLE PARAMETERS TO A NETWORKED SERVER

TECHNICAL FIELD

The present specification generally relates to electronic systems for vehicles and, more specifically, to electronic systems for vehicles that communicate with a networked server.

BACKGROUND

Vehicle owners may have an interest in comparing the performance of their vehicle and, by extension, their performance as drivers, against other vehicle owners. Previously, vehicle owners would visit a website wherein the vehicle owner could input data associated with the performance of the vehicle. Some vehicle owners have transcribed input data from the vehicle instrument cluster and uploaded the data to the website. Other vehicle owners take photographs of the instrument cluster of their vehicles and upload those photographs to the website as verification of the input data. Upon the input of data from a plurality of drivers, the plurality of vehicle owners are able to compare their individual vehicle performance to that of the group and to other vehicle owners individually.

Accordingly, a need exists for communication systems for vehicles and vehicles incorporating the same that allow the vehicle to communicate with a networked server.

SUMMARY

In one embodiment, a vehicle having a driver statistic system for interfacing with a network includes a wheel speed sensor for measuring vehicle speed, an engine control unit for measuring fuel consumption of the vehicle, network interface hardware for communicating with a network, and an electronic control unit communicatively coupled to the wheel speed sensor, the engine control unit, and the network interface hardware. The electronic control unit includes a processor and memory storing a computer readable and executable instruction set. When the instruction set is executed by the processor, the electronic control unit processes sensor signals received from the wheel speed sensor and the engine control unit to determine fuel consumption of the vehicle. The electronic control unit transmits a vehicle status signal to the network interface hardware, where the vehicle status signal is indicative of the fuel consumption of the vehicle. The network interface hardware transmits the vehicle status signal to the network, and the network interface hardware receives a vehicle performance signal from the network indicative of a driver performance ranking, wherein the driver performance ranking is based on the fuel consumption of the vehicle.

In another embodiment, a vehicle having a driver statistic system for interfacing with a network includes at least one vehicle sensor for sensing a vehicle parameter, an in-vehicle display, network interface hardware for communicating with a network, and an electronic control unit communicatively coupled to the vehicle sensor, the in-vehicle display, and the network interface hardware. The electronic control unit includes a processor and memory storing a computer readable and executable instruction set. When the instruction set is executed by the processor, the electronic control unit processes a sensor signal received from the vehicle sensor and the electronic control unit transmits a vehicle status signal to the network interface hardware indicative of the vehicle parameter. The network interface hardware transmits the vehicle status signal to the network and receives a vehicle performance signal from the network, where the vehicle performance signal is indicative of a driver performance ranking based on the vehicle parameter. The electronic control unit transmits a display signal to the in-vehicle display based on the vehicle performance signal received from the network such that the in-vehicle display displays the driver performance ranking.

In yet another embodiment, a method for a vehicle to interface with a network includes sensing at least one vehicle parameter with a vehicle sensor, transmitting a sensor signal from the vehicle sensor and receiving the sensor signal at an electronic control unit of the vehicle, where the sensor signal is indicative of the vehicle parameter, and processing the sensor signal at the electronic control unit of the vehicle to produce a vehicle status signal. The method also includes transmitting the vehicle status signal from the electronic control unit to network interface hardware, transmitting the vehicle status signal from the network interface hardware to the network, and receiving a vehicle performance signal from the network at the network interface hardware of the vehicle, where the vehicle performance signal is indicative of driver performance ranking based on the vehicle parameter. The method further includes transmitting the vehicle performance signal from the network interface hardware to the electronic control unit, and transmitting a display signal from the electronic control unit to a in-vehicle display, where the display signal is indicative of the driver performance ranking.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
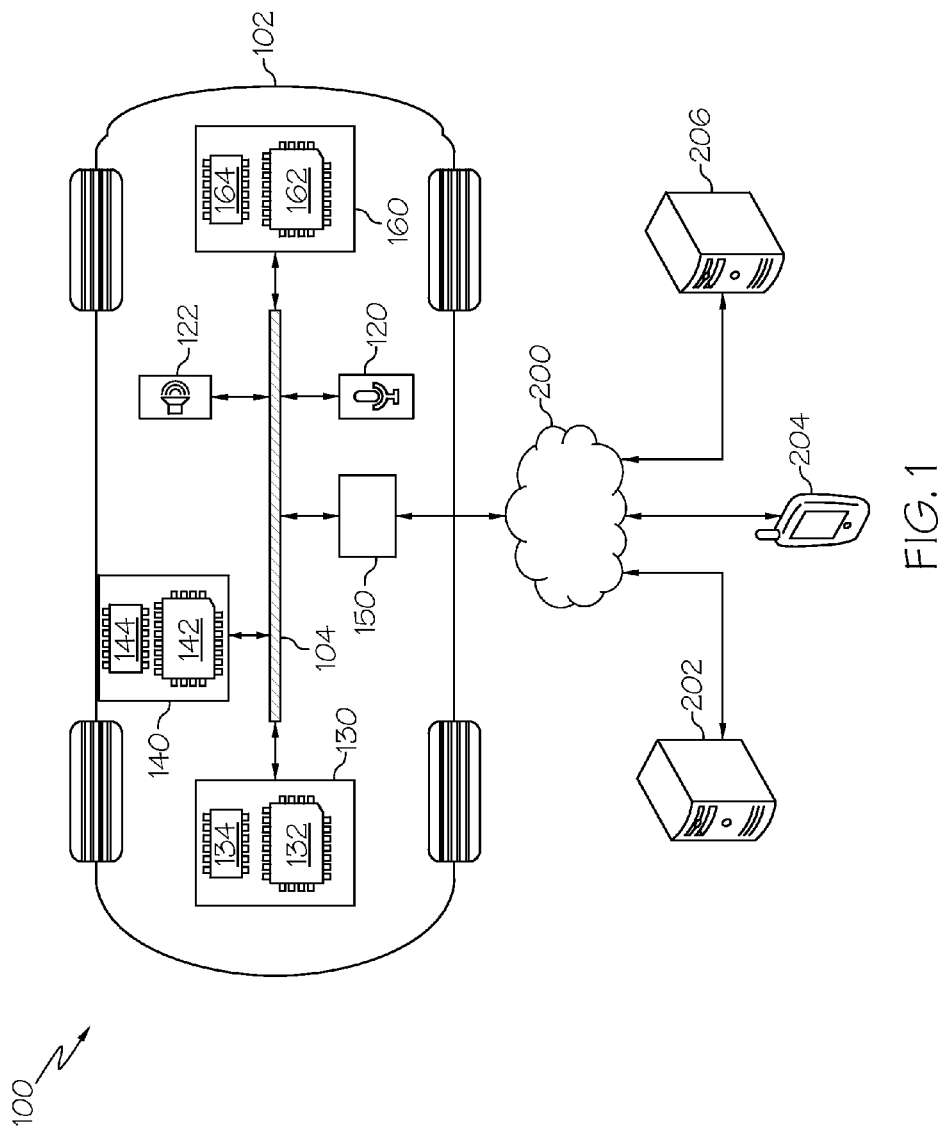
FIG. 1 schematically depicts a vehicle having a driver statistic system for communicating with a network according to one or more embodiments shown or described herein.

FIG. 1 generally depicts a vehicle having a system for communicating with a networked server. The vehicle includes an electronic control unit that receives data from sensors in the vehicle. The electronic control unit transmits vehicle signals to a communications module, which transmits a vehicle status signal to a networked server. The networked server may include a "cloud" based server. The networked server performs calculations on the vehicle status signal received from the vehicle as well as transmits a vehicle performance signal, which is received by the communications module of the vehicle. The vehicle performance signal may correspond to a ranking of comparable vehicles that ranks vehicle performance and/or driver performance. The vehicles incorporating such systems and networked servers that communicate with such vehicles will be described in more detail below.

Referring now to FIG. 1, an embodiment of a networked system 100 comprising a vehicle 102 is schematically depicted. It is noted that, while the vehicle 102 is depicted as an automobile, the vehicle 102 may be any passenger or non-passenger vehicle such as, for example, a terrestrial, aquatic, and/or airborne vehicle. The vehicle 102 may comprise a communication path 104 that provides data interconnectivity between various vehicle modules disposed within the vehicle 102. Accordingly, the communication path 104 communicatively couples any number of vehicle modules with one another, and allows the vehicle modules to operate in a distributed computing environment. Specifically, each of the vehicle modules can operate as a node that may send and/or receive data. In one embodiment, the communication path 104 can comprise a conductive material that permits the transmission of electrical data signals to processors, memories, sensors, and actuators throughout the vehicle 102. In another embodiment, the communication path 104 can be a vehicle bus, such as for example a LIN bus, a CAN bus, a VAN bus, and the like. In further embodiments, the communication path 104 may be wireless or, alternatively, an optical waveguide. As used herein, the term "communicatively coupled" means that the components are capable of exchanging data signals with one another such as, for example, electrical signals via conductive medium, electromagnetic signals via air, optical signals via optical waveguides, and the like.

The vehicle 102 generally comprises input/output hardware communicatively coupled with the communication path 104. The input/output hardware serves as an interconnection between a driver and the vehicle 102. The input/output hardware can be any device capable of transforming mechanical, optical, or electrical signals into a data signal capable of being transmitted with the communication path 104. Moreover, the input/output hardware can be any device capable of transforming a data signal into a mechanical, optical, or electrical output. Each individual component of the input/output hardware can optionally include one or more processors and one or more memories. Alternatively, each individual component of the input/output hardware can optionally omit a processor and/or a memory. Accordingly, it is noted that, while specific components are described herein as including a processor and/or a memory, the embodiments described herein should not be so limited.

The term "sensor," as used herein, means a device that measures a physical quantity and converts it into a data signal, which is correlated to the measured value of the physical quantity, such as, for example, an electrical signal, an electromagnetic signal, an optical signal, a mechanical signal, or the like. The input/output hardware can further include a microphone 120 for receiving input from a user. The microphone 120 can be any sensor that transforms mechanical vibrations into a data signal. The input/output hardware may also include a speaker 122 for transforming data signals into mechanical vibrations. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. Additional sensors will be discussed below.

Still referring to FIG. 1, the input/output hardware can include one or more displays for visually presenting data. The one or more displays can be located throughout the passenger compartment of the vehicle 102 and can include any medium capable of transmitting an optical output such as, for example, a cathode ray tube, light emitting diodes, liquid crystal displays, plasma displays, or the like. Each of the one or more displays can be a touchscreen that, in addition to providing optical information, detects the presence and location of a tactile input upon a surface of or adjacent to the display. Accordingly, each display can receive mechanical input directly upon the optical output provided by the display.

In one embodiment, the vehicle 102 may include an electronic control unit 130 communicatively coupled with the communication path 104. The electronic control unit 130 can comprise a control unit processor 132 communicatively coupled to a control unit memory 134. The vehicle 102 may further include an instrument cluster display 140 communicatively coupled with the communication path 104. The instrument cluster display can comprise a cluster processor 142 communicatively coupled with a cluster memory 144. The vehicle 102 may also include an in-vehicle display 160 communicatively coupled with the communication path 104. The in-vehicle display 160 may include a display processor 162 communicatively coupled with the display memory 164. Additionally, it is noted that, while each of the electronic control unit 130, the instrument cluster display 140, and the in-vehicle display 160 are depicted in FIG. 1 as including an integral processor and memory, each of the electronic control unit 130, the instrument cluster display 140, and the in-vehicle display 160 may be implemented without a processor and/or a memory. For example, any of the processors described herein may be separately located within any component communicatively coupled with the communication path 104. Accordingly, the vehicle 102 may include a plurality of components each having one or more processors that are communicatively coupled with one or more of the other components. Thus, the embodiments described herein may utilize a distributed computing arrangement to perform any portion of the logic described herein.

According to the embodiments described herein, a processor means any device capable of executing machine readable instructions. Accordingly, each processor may be a controller, an integrated circuit, a microchip, a computer, or any other computing device. The memory described herein may be RAM, ROM, a flash memory, a hard drive, or any device capable of storing machine readable instructions.

Embodiments of the present disclosure comprise logic that includes machine readable instructions or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components.

Moreover, the logic can be distributed over various components that are communicatively coupled over a network 200 that may include one or more cellular networks, satellite networks and/or computer networks such as, for example, a wide area network, a local area network, personal area network, a global positioning system and combinations thereof. Accordingly, the vehicle 102 can be communicatively coupled to the network 200 via wires, via a wide area network, via a local area network, via a personal area network, via a cellular network, via a satellite network and the like. Suitable local area networks may include wired ethernet and/or wireless technologies such as, for example, Wi-Fi. Suitable personal area networks may include wireless technologies such as, for example, IrDA, BLUETOOTH, Wireless USB, Z-WAVE, ZIGBEE, and the like. Alternatively or additionally, suitable personal area networks may include wired computer buses such as, for example, USB and FIREWIRE. Suitable cellular networks include, but are not limited to, technologies such as LTE, WiMAX, UMTS, CDMA, and GSM. Thus, any components of the vehicle 102 can utilize one or more network 200 components to transmit signals over the Internet or World Wide Web.

In one embodiment, the vehicle 102 comprises network interface hardware 150 for communicatively coupling the vehicle 102 with the network 200. The network interface hardware 150 can be communicatively coupled to the communication path 104 and can be any device capable of transmitting and/or receiving data via the network 200. Accordingly, the network interface hardware 150 can include an antenna and/or other communication transceiver for sending and/or receiving any wired or wireless communication. For example, the network interface hardware 150 may include an antenna, a modem, LAN port, wireless fidelity (Wi-Fi) card, WiMax card, mobile communications hardware, near-field communication hardware, satellite communication hardware and/or any wired or wireless hardware for communicating with other networks and/or devices.

The network 200 can communicatively couple the vehicle 102 to other devices in a flexible client-server relationship, i.e., the vehicle 102 can be a server to and/or a client of any device communicatively coupled to the vehicle 102 via the network 200. Specifically, the network 200 can be configured to enable the delivery of cloud resources to and/or from the vehicle 102. Any device communicatively coupled to the vehicle 102 can deliver a cloud resource to the vehicle 102 via the network 200. Similarly, the vehicle 102 can deliver a cloud resource via the network 200 to any device communicatively coupled to the vehicle 102. Accordingly, cloud resources such as, for example, processing, storage, software, and information can be shared via the network 200.

Referring still to FIG. 1, a networked system 100 for implementing one or more of the embodiments for controlling home automation disclosed herein is depicted. The network 200 may be utilized to communicatively couple a vehicle 102, one or more remote computing devices 202, one or more mobile devices 204, and a third-party computing device 206. Accordingly, each of the vehicle 102, one or more remote computing devices 202, the one or more mobile devices 204, and the third-party computing device 206 can be communicatively coupled to one another directly or indirectly via the network 200. For example, one or more devices communicatively coupled to the network 200 can operate as an intermediary to transmit data between any of the other devices. Accordingly, the network 200 can facilitate a distributed computing arrangement amongst the vehicle 102, the one or more remote computing devices 202, the one or more mobile devices 204, and the third-party computing device 206. Specifically, any of the devices communicatively coupled to the network 200 can share cloud resources such that each communicatively coupled device can perform any portion of the logic described herein.

As is noted above, the vehicle 102 can be communicatively coupled to the one or more remote computing devices 202 via the network 200. Each of the one or more remote computing devices 202 can comprise one or more processors and one or more memories. The one or more processors can execute logic to provide cloud resources to the vehicle 102 and/or any other device communicatively coupled to the network 200. For example, the one or more remote computing devices 202 can provide supplementary processing power, via relatively high powered processors, to the vehicle 102. Additionally, the one or more remote computing devices 202 can provide supplementary data storage to the vehicle 102. Moreover, the one or more remote computing devices 202 can provide platforms such as, for example, a social networking service, news service, weather service, traffic service, map service (e.g., restaurant data, fuel station data, service station data), and any other service capable of being exchanged between a server and a client.

The networked system 100 may further comprise one or more mobile devices 204 communicatively coupled to the vehicle 102 via the network 200. Each of the one or more mobile devices 204 can comprise one or more processors and one or more memories. Accordingly, the one or more mobile devices 204 can operate as a client and/or a server with respect to the vehicle 102. The one or more mobile devices 204 may be configured as a cellular or mobile telephone, with functionality for wireless data communications. Thus, while the mobile device 204 is depicted herein as a mobile telephone, it should be understood that the mobile device 204 can be any mobile communications device that can exchange data via a mobile telecommunication service such as, for example, a personal digital assistant, a smart phone, or a laptop computer with a wireless communication peripheral. Furthermore, it is noted that one or more mobile devices 204 may further be configured to communicate data via one or more cellular networks, satellite networks and/or computer networks. In one embodiment, the network interface hardware 150 of the vehicle 102 can be communicatively coupled to the one or more mobile devices 204 via a personal area network such that the one or more mobile devices 204 communicatively couples the network interface hardware 150 to the network 200.

Figure 2:
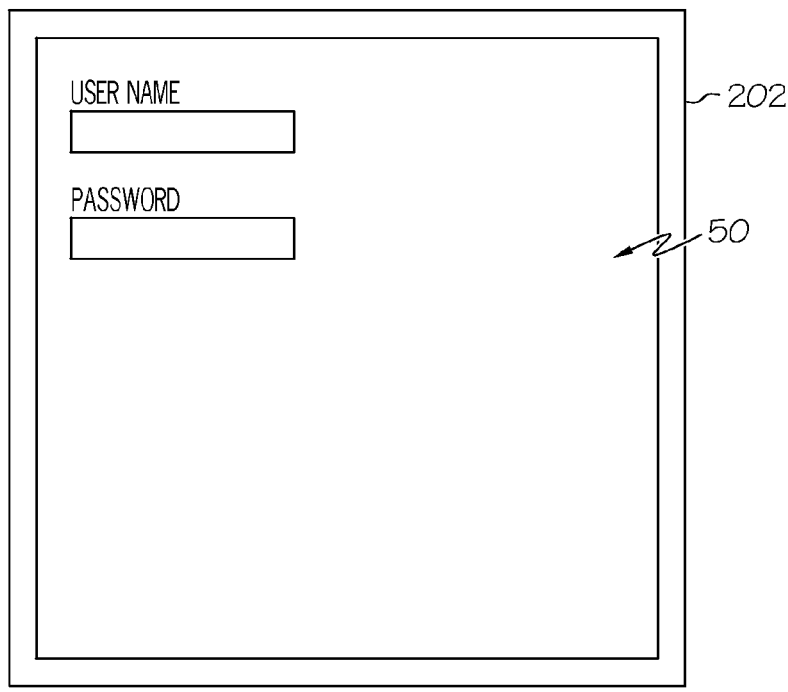
FIG. 2 schematically depicts a web portal for reviewing data associated with a vehicle having a driver statistic system for communicating with a network according to one or more embodiments shown or described herein.

Referring now to FIG. 2, a user, for example, an owner of a vehicle and/or a driver of a vehicle, may access a web portal 50 by using the remote computing device 202 or the mobile device 204. The user may create a user account that provides access to data on the web portal 50 that is accessed from the network 200. The user may enter a user name and provide a password to authenticate the user on the web portal 50. The user may also provide a variety of personal identifying information and/or vehicle identifying information including, but not limited to, the user's name, home location, vehicle make, vehicle model, vehicle model year, vehicle configuration, and vehicle identification number. Additionally, the web portal 50 may accesses a database that is available through the network 200 that includes a variety of vehicle data that can be associated with a user account based on the entered vehicle identification number. Additionally, the user may designate the user account information associated with the network interface hardware 150 of the vehicle 102, thereby allowing the vehicle 102 to communicate with the web portal 50 through the network 200 so as to enable transmission of and receipt of data associated with the user account.

Figure 3:
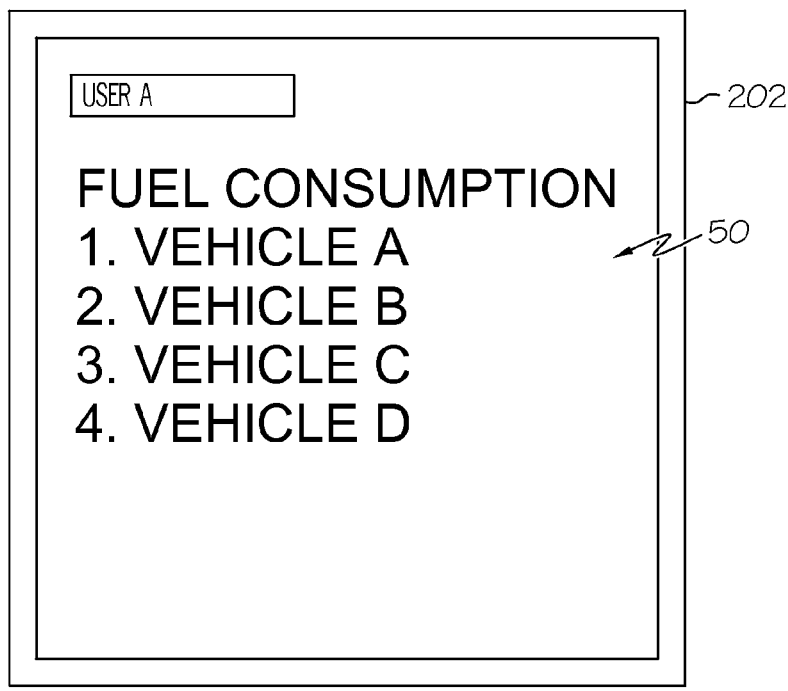
FIG. 3 schematically depicts a web portal for reviewing data associated with a vehicle having a driver statistic system for communicating with a network according to one or more embodiments shown or described herein.

As multiple users create user accounts on the web portal 50, the user accounts may be segregated into a plurality of pre-determined user groups. The pre-determined user groups may be defined based on vehicle and/or location-based parameters of the users including vehicle type such as vehicles grouped according to EPA vehicle class, vehicle make, vehicle model, vehicle configuration such as vehicles having similar drivetrains, engine displacement, and transmissions, and user home location. Each of the vehicles 102 within the pre-determined user group may include the elements of the vehicle 102 described above in regard to FIG. 1 that allow for the vehicles 102 to communicate with the network 200. The vehicles 102 may transmit and/or receive data with the network 200. Referring now to FIG. 3, the data transmitted from the vehicles 102 to the network 200 allows the network 200 to compute a driver performance ranking based on the data received from each of the vehicles 102. Further, the network 200 may compute a plurality of driver performance rankings within the pre-determined user group based on a variety of data included in a vehicle status signal transmitted by the vehicle 102, as will be discussed in further detail below. Users having user accounts can log in to the web portal 50 and inspect the driver performance ranking as computed by the network 200. Users can also select which criteria is of interest and display the driver performance ranking that is associated with that criteria.

Figure 4:
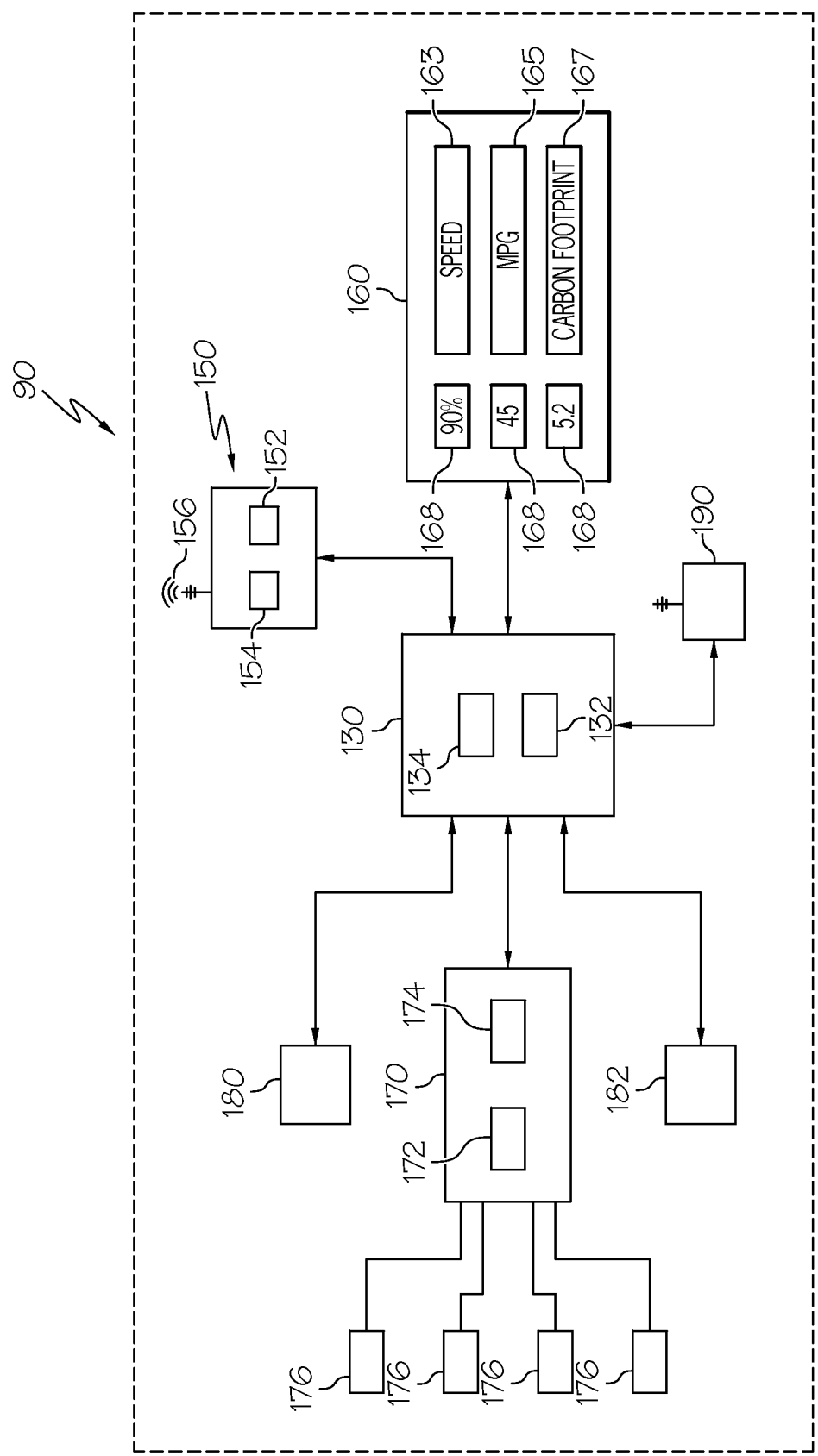
FIG. 4 schematically depicts a driver statistic system for a vehicle having a driver statistic system for communicating with a network and a remote computer terminal according to one or more embodiments shown or described herein.

Referring now to FIG. 4, a schematic depiction of a driver statistic system 90 for a vehicle 102 is illustrated. The driver statistic system 90 includes the in-vehicle display 160 communicatively coupled to an electronic control unit 130. The in-vehicle display 160 is configured to display a plurality of vehicle status data 168, and an associated vehicle status label 163, 165, 167. The vehicle status data 168 may be related to fuel consumption of the vehicle 102, speed of the vehicle 102, position of the vehicle 102, fuel level in the fuel tank of the vehicle 102, battery charge level of the vehicle 102, or the like. In some embodiments, the electronic control unit 130 is reconfigurable to allow a driver or passenger of the vehicle to change the vehicle status data 168 and the associated vehicle status label 163, 165, 167 to display the desired data. The in-vehicle display 160 allows a driver of the vehicle 102 to visually inspect the status of various components of the vehicle 102 equipped with sensors for evaluating vehicle status.

The driver statistic system 90 depicted in FIG. 4 further includes a plurality of sensors that measure the performance variables of the vehicle 102. In one embodiment, the vehicle 102 includes at least one wheel speed sensor 180 that is communicatively coupled to the electronic control unit 130. The wheel speed sensor 180 transmits a vehicle sensor signal to the electronic control unit 130 that corresponds to the rate of rotation of a wheel. Based on the vehicle sensor signal sent from the wheel speed sensor 180, the electronic control unit 130 calculates vehicle speed.

The vehicle 102 may further include a fuel fill sensor 182 for gasoline or diesel-fueled vehicles. The fuel fill sensor 182 transmits a vehicle sensor signal to the electronic control unit 130 that corresponds to the fill level of fuel in the fuel tank. Alternatively or in addition, for electric or hybrid-electric vehicles, the vehicle 102 may include a battery status sensor. The battery status sensor transmits a vehicle sensor signal that corresponds to the charge level of the batteries. An instruction set stored in the control unit memory 134 of the electronic control unit 130 may be executed to calculate vehicle range based on the remaining fuel and/or electricity on-board the vehicle 102.

In some embodiments, the driver statistic system 90 of the vehicle 102 may also include a satellite navigation system receiver 190 that is communicatively coupled to the electronic control unit 130 through the communication path 104. The satellite navigation system receiver 190, for example a Global Positioning Satellite (GPS) receiver, receives a signal from a plurality of satellites to determine the location of the vehicle 102. The satellite navigation system receiver 190 transmits a vehicle sensor signal that contains a position signal indicating the position of the vehicle 102 to the electronic control unit 130. The satellite navigation system receiver 190 may also transmit a vehicle sensor signal to the electronic control unit 130 that includes the posted speed limit of the road on which the vehicle 102 is traveling. The posted speed limit data may be stored locally in the vehicle 102, such as in a memory communicatively coupled to the satellite navigation system receiver 190. By comparing the sensor data received from the wheel speed sensor 180 to the sensor data received from the satellite navigation system receiver 190, the electronic control unit 130 may calculate a targeted speed coefficient that compares the actual speed of the vehicle 102 to the posted speed limit.

For vehicles 102 including combustion engines, the vehicle 102 includes an engine control unit 170. The engine control unit 170 may include an engine control unit memory 174 for storing a computer readable and executable instruction set and an engine control unit processor 172. The engine control unit processor 172 may adjust engine operating parameters to provide the required power delivery of the engine based on the instruction set stored in the engine control unit 170. In such embodiments, the engine control unit 170 is communicatively coupled to at least one fuel injector 176. The fuel injectors 176 meter fuel into the combustion chambers for power generation by the engine. The engine control unit 170 may transmit a vehicle sensor signal to the electronic control unit 130 that corresponds to the amount of fuel metered by the fuel injectors 176 to the engine. The instruction set stored in the control unit memory 134 of the electronic control unit 130 may calculate fuel consumption of the vehicle 102. The engine control unit 170 may also transmit any of the other data stored locally in the engine control unit memory 174 of the engine control unit 170 that relates to engine performance.

As noted above, the vehicle 102 may also include network interface hardware 150 that is communicatively coupled to the electronic control unit 130. The network interface hardware 150 may include a receiver 152 and a transmitter 154 that are coupled to an antenna. The instruction set stored in the control unit memory 134 of the electronic control unit 130 is configured to transmit a vehicle status signal to the network interface hardware 150. The vehicle status signal may include a variety of vehicle performance and/or vehicle status data including data that was transmitted by the various vehicle sensors as vehicle sensor signals and received by the electronic control unit 130. The network interface hardware 150 is configured to transmit the vehicle status signal 156 wirelessly to the network 200 (see FIG. 1).

Each of the vehicles 102 within a pre-determined user group may include substantially similar hardware and software as other vehicles in the pre-determined user group. Commonality of components of the vehicles 102 permits comparison of the driver performance and/or vehicle performance of the vehicles 102 in the pre-determined user group.

While specific mention has been made hereinabove to possible configurations of vehicles 102, it should be understood that the listing of vehicle components and sensors is non-exhaustive. In addition, vehicles may include a plurality of sensors that measure vehicle performance or status including sensors that measure braking loads, steering loads, steering inputs, lateral vehicle loading, payload loads, towing loads, engine operation status, window open status, seat belt status, seat belt usage rate of occupants, turn signal use, and the like. These various quantities may be included in the vehicle status signal.

Figure 5:
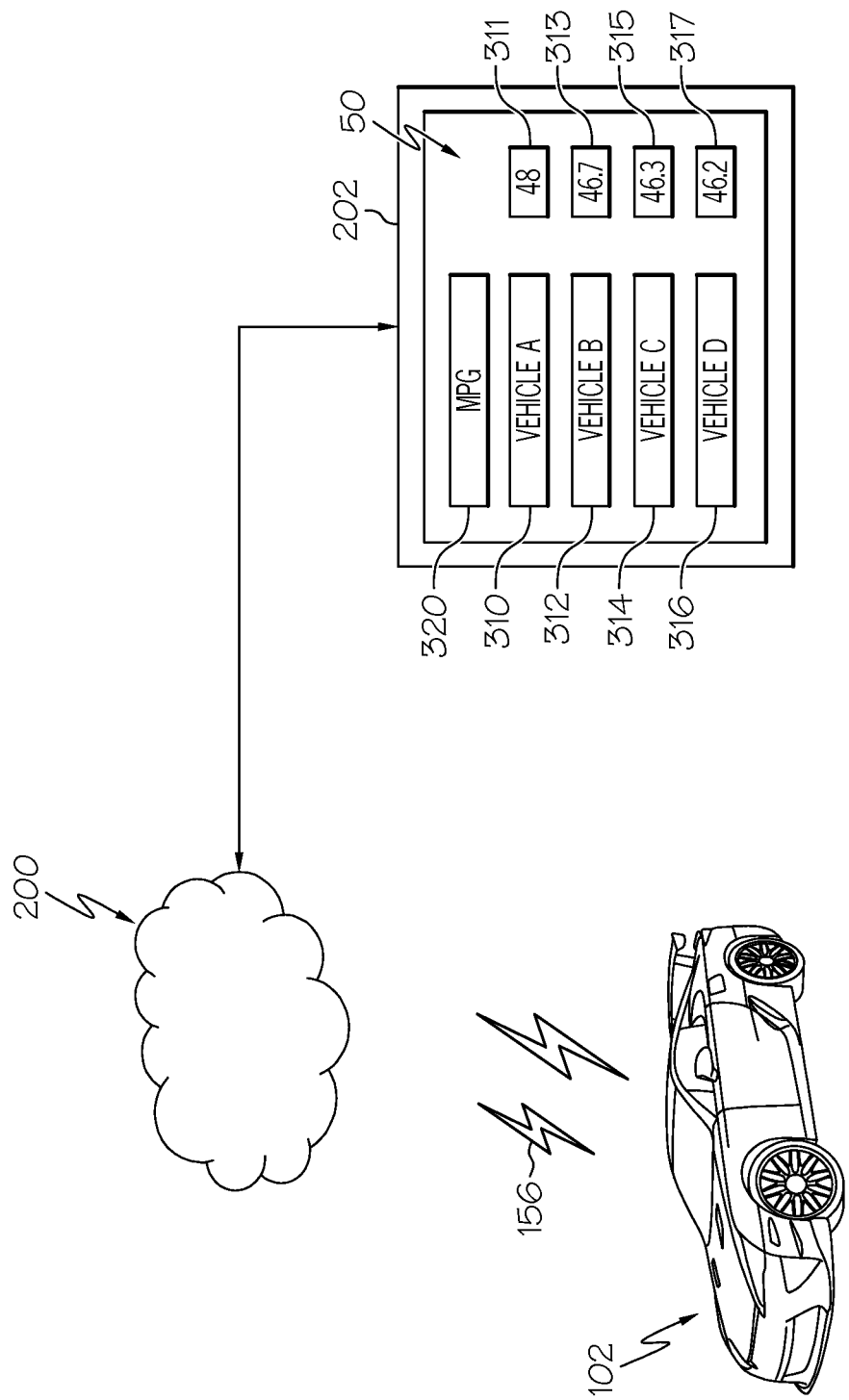
FIG. 5 schematically depicts a driver statistic system for a vehicle having a driver statistic system for communicating with a network and a remote computer terminal according to one or more embodiments shown or described herein.

Referring now to FIG. 5, the vehicle status signal 156 that is transmitted wirelessly from the vehicle 102 is transmitted to the network 200. The vehicle status signal 156 may include user account information that allows the vehicle status signal 156 to be associated with a user account on the web portal 50, as discussed hereinabove. The vehicle status signal 156 may include a source identifier that excludes specific user account information. The source identifier may correspond with a user account on the web portal 50. When the vehicle status signal 156 is transmitted to the network 200, the source identifier included with the vehicle status signal 156 may be used by the network 200 to associate the vehicle status signal 156 with the appropriate user account. The vehicle status signal 156 is routed to the web portal 50 on the network 200, where the vehicle status signal 156 is associated with the driver and/or vehicle owner's pre-established user account, as discussed hereinabove.

The network 200 is also configured to process the vehicle status signals 156 and to determine a ranking of vehicles in the pre-determined user group based on the vehicle status signals 156 sent from a plurality of vehicles 102. For example, the network 200 evaluates the vehicle status signals 156 from each of the vehicles 102 and calculates a listing of drivers, vehicle owners, and/or vehicles 102 from those having the highest vehicle performance to those having the lowest vehicle performance. The vehicle 102 can be ranked according to any of the data contained in the vehicle status signal 156, for example, vehicle fuel consumption including fuel economy, average speed of the vehicle 102, average acceleration rate of the vehicle 102, average deceleration rate of the vehicle 102, carbon dioxide production, speed as compared with posted limits, average braking loads of the vehicle 102, average steering loads, average steering inputs, average lateral vehicle loads, average payload loads, average towing loads, engine operating status, window open status, seat belt usage rate of occupants, turn signal usage rates, and the like.

The network 200 may also parse the vehicle status signals 156 from the vehicles 102 to compare a plurality of comparable vehicles 102 in a subset of the pre-determined user groups. For example, the network 200 may parse the vehicle status signals 156 into groups of vehicles having the same model and manufacturer. The network 200 may parse the vehicle status signals 156 to group the vehicles 102 into a subset of the pre-determined user groups of vehicles having the same model year. The network 200 may parse the vehicle status signals 156 to group the vehicles 102 into a subset of the pre-determined user groups of vehicles having the same general configuration and EPA vehicle classification (i.e., mini-compact cars, subcompact cars, compact cars, midsize cars, large cars, small station wagon, midsize station wagon, sports utility vehicles, small pickup trucks, standard pickup trucks, and the like). The network 200 may also parse the vehicle status signals 156 to compare a plurality of vehicles 102 in the pre-determined user group that are geographically co-located with one another based on the satellite navigation system receiver 190 sensor signals. For example, vehicles 102 located within a pre-determined distance, such as within about a 500 mile range, may be geographically co-located with one another for purposes of grouping into a subset of the pre-determined user group. Further, vehicles 102 located within a pre-determined geographic region, for example, located within a state or a group of states, may be geographically co-located with one another for purposes of grouping into a subset of the pre-determined user group.

Still referring to FIG. 5, the driver performance ranking determined by the network 200 based on vehicle status signals 156 received from vehicles 102 associated with registered users of the web portal 50 may be accessible to users by logging in to the web portal 50. As discussed hereinabove, the web portal 50 is accessible by a variety of computing devices that are connected to the network 200, for example remote computing devices 202, mobile devices 204, and third-party computing devices 206. As depicted in FIG. 5, at least a portion of the driver performance ranking of the registered users may be displayed on a remote computing device 202 when a user accesses the web portal 50. A user of the remote computing device 202 may select the vehicle performance parameter 320 of interest to display the driver performance ranking of other users whose user accounts are associated with vehicle identifiers 310, 312, 314, 316. Further, the quantity of the vehicle performance parameter 311, 313, 315, 317 transmitted in the vehicle status signal 156 that was used in the calculation of the driver performance ranking may be displayed in proximity to each vehicle identifier 310, 312, 314, 316. Because the vehicle status signals 156 can be sent autonomously and continuously, the ranking of the users listed on the web portal 50 can be viewed in a real-time comparison on the web portal 50.

At least a portion of the driver performance ranking of the users may be transmitted by a user to the third-party computing device 206, for example a third-party computer server that is operated by a third-party as a social media web portal. The portion of the vehicle performance ranking of the vehicles 102 may be displayed on a user's pre-existing account on the social media web portal to stimulate discussion of the driver and/or vehicle performance.

Figure 6:
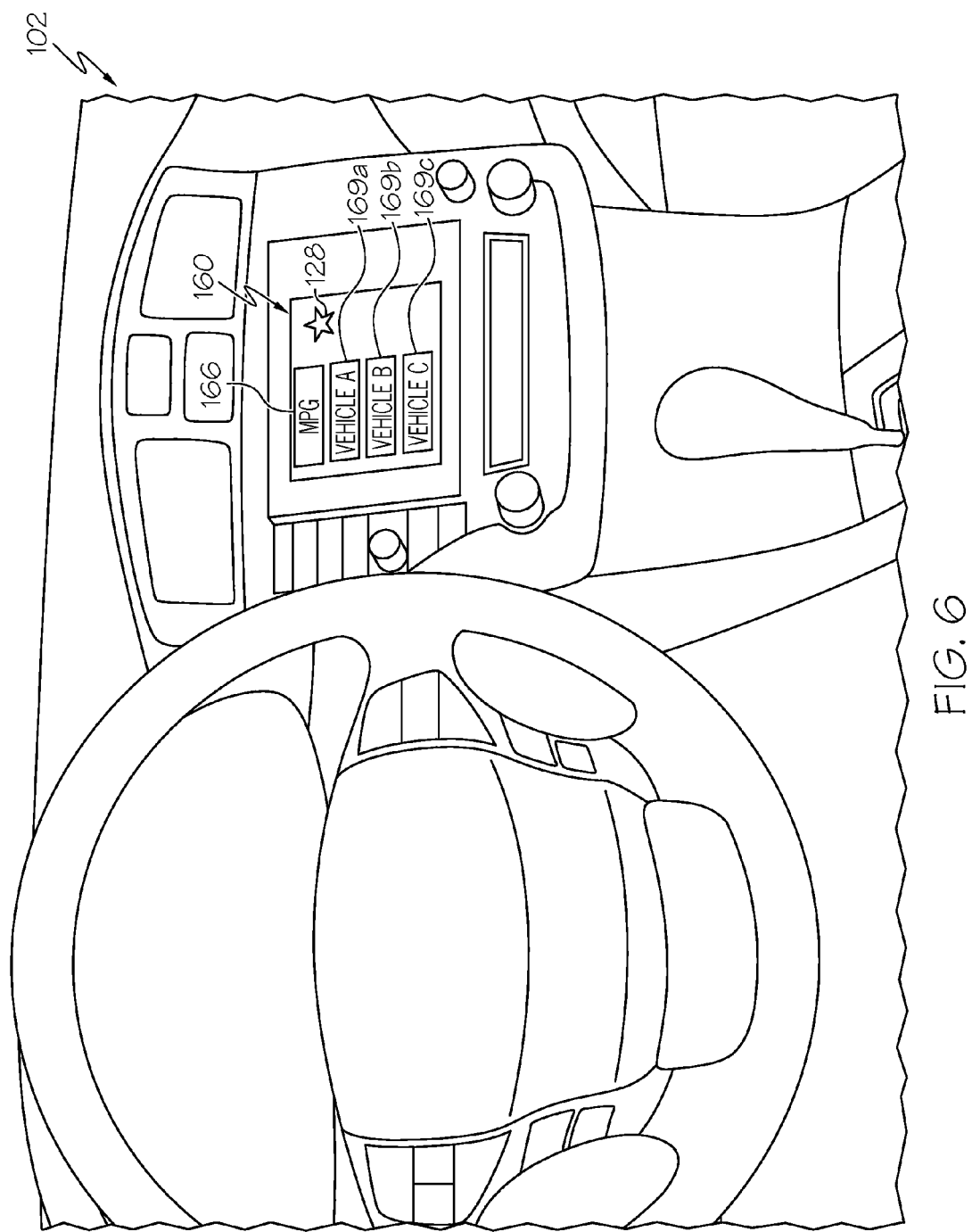
FIG. 6 schematically depicts a vehicle interior having a driver statistic system for communicating with a network according to one or more embodiments shown or described herein.

Referring now to FIG. 6, the vehicle 102 may include an in-vehicle display 160 that is configured to display at least a portion of the driver performance ranking that is received as a vehicle performance signal from the network 200. Similar to the web portal 50 accessed from a remote computing device 202 discussed hereinabove, a user of the in-vehicle display 160 may select the vehicle status data 166 of interest for which to display the ranking of user identifiers 169a, 169b, 169c. Additionally, the in-vehicle display 160 may include a sync indicator 128 that appears on the in-vehicle display 160 when the network interface hardware 150 (shown in FIG. 3) is transmitting and/or receiving signals with the network 200. Similar to the vehicle performance ranking displayed on a remote computing device 202, the ranking of the users listed on the in-vehicle display 160 can be view in a real-time comparison on the in-vehicle display 160.

In addition, the administrator of the web portal 50 may wish to provide incentives or marketing opportunities to particular user accounts that are pre-established on the web portal 50. The administrator of the web portal 50 may wish to provide marketing opportunities to user accounts having vehicle performance and/or driver performance that are highly ranked in comparison with the plurality of user accounts associated with comparable vehicles. The marketing opportunity may act as an incentive to encourage drivers and/or owners to operate their vehicles at a higher performance. This marketing opportunity may be communicated to the driver of the vehicle 102 by transmitting an electronic marketing offer to the network interface hardware 150 of the vehicle 102. The electronic marketing offer may be displayed on the in-vehicle display 160. Alternatively, or in addition, the electronic marketing offer may be transmitted through the network 200 to the remote computing device 202. A user may be notified of receipt of the electronic marketing offer with an electronic communication including, but not limited to, text messages or email. Further, the electronic marketing offer may be transmitted to a third party service provider, for example a car dealership service center. Transmission of the electronic marketing offer allows the third party service provider to validate and verify the electronic marketing offer prior to redemption.

Figure 7:
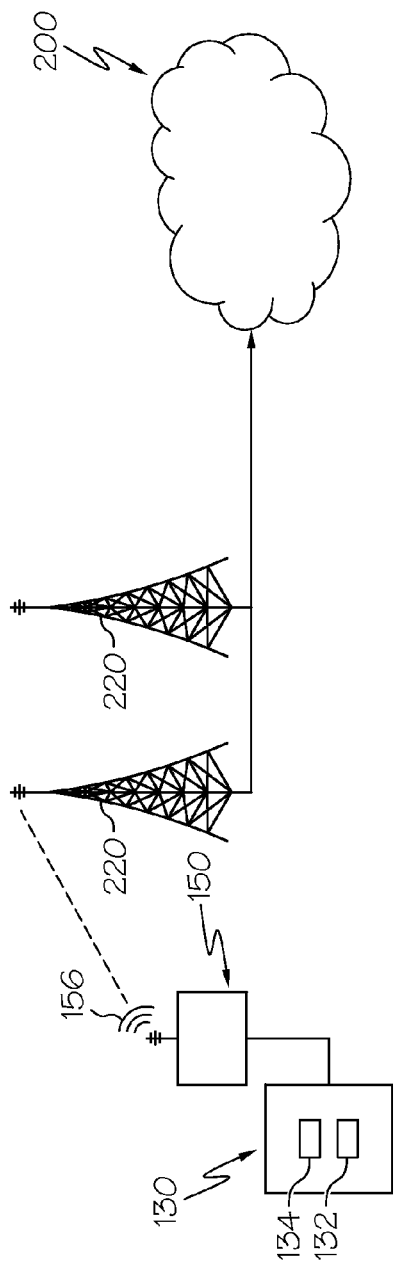
FIG. 7 schematically depicts a portion of a driver statistic system for communicating with a network according to one or more embodiments shown or described herein.
Figure 8:
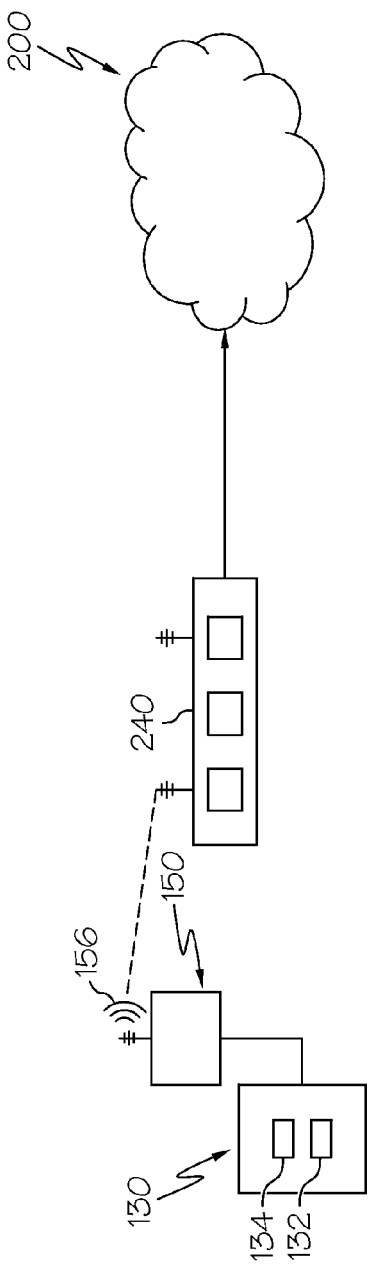
FIG. 8 schematically depicts a portion of a driver statistic system for communicating with a network according to one or more embodiments shown or described herein.
Figure 9:
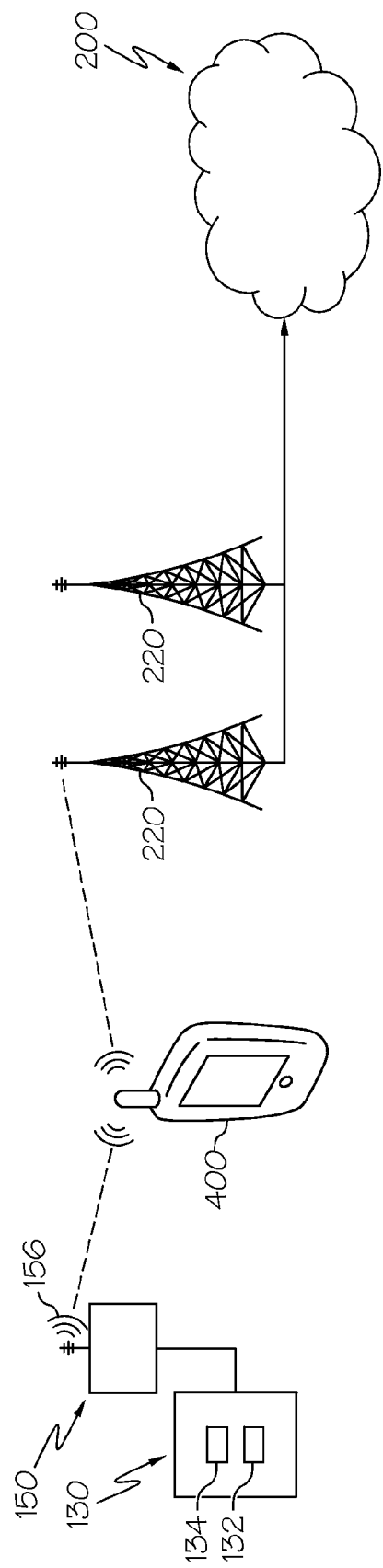
FIG. 9 schematically depicts a portion of a driver statistic system for communicating with a network according to one or more embodiments shown or described herein.

Referring now to FIGS. 7-9, embodiments of the network interface hardware 150 of the vehicle 102 are depicted. Referring to FIG. 7, one embodiment of the network interface hardware 150 includes a transmitter and receiver for communicating with a wireless wide area network 220. The wireless wide area network may include, for example, a mobile telecommunications cellular network using technologies such as LTE, WiMAX, UMTS, CDMA, and GSM to transmit data between the network interface hardware 150 coupled to the electronic control unit 130, and the network 200. Because the wireless wide area network 220 is in electronic communication with the network 200, a vehicle status signal 156 transmitted from the vehicle 102 to the wireless wide area network 220 is routed to the network 200. Using such network interface hardware 150, the vehicle 102 may transmit a vehicle status signal 156 when the network interface hardware 150 is connected to the wireless wide area network 220.

Referring now to FIG. 8, another embodiment of the network interface hardware 150 includes a transmitter and receiver for communicating with a wireless local area network 240. Suitable wireless local area networks 240 are based on IEEE 802.11 standards and are marketed as "Wi-Fi." Using such network interface hardware 150, the vehicle 102 may transmit a vehicle status signal 156 when in range of the wireless local area network 240. The vehicle 102 may be in range of the wireless local area network 240 when the vehicle 102 is in a location proximate to a user's home, and may be out of range when the vehicle 102 is in a location away from the user's home. As such, the vehicle 102 may transmit a packet of data stored in the control unit memory 134 of the electronic control unit 130 when the user returns home.

Referring now to FIG. 9, one embodiment of the network interface hardware 150 includes a personal area network transmitter and receiver. The network interface hardware 150 communicates with a mobile handset device 400 on a personal area network. The mobile handset device 400 operates on a wireless wide area network 220. The mobile handset device 400, therefore, acts as a wireless communication bridge between the network interface hardware 150 and the wireless wide area network 220.

Vehicles according to the present disclosure may include one or more of the above-described embodiments of the network interface hardware 150 for transmitting a vehicle status signal to the network 200 and receiving a vehicle performance signal from the network 200.

It should now be understood that vehicles and systems according to the present disclosure allow vehicles to interface with a network. An electronic control unit of the vehicle transmits a vehicle status signal to the network. The network processes the vehicle status signal and ranks a plurality of vehicle status signals from a plurality of vehicles, assigning a ranking to each of the vehicles that corresponds to vehicle performance and/or driver performance. The network transmits a vehicle performance signal to the vehicle that corresponds to the ranking of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle comprising a driver statistic system for interfacing with a network, the driver statistic system comprising:
   a wheel speed sensor for measuring vehicle speed;
   an engine control unit for measuring fuel consumption of the vehicle;
   network interface hardware for communicating with a network; and
   an electronic control unit communicatively coupled to the wheel speed sensor, the engine control unit, and the network interface hardware, wherein the electronic control unit comprises a processor and memory storing a computer readable and executable instruction set, wherein, when the instruction set is executed by the processor:
   the electronic control unit processes sensor signals received from the wheel speed sensor and the engine control unit to determine fuel consumption of the vehicle;
   the electronic control unit transmits a vehicle status signal to the network interface hardware, wherein the vehicle status signal is indicative of the fuel consumption of the vehicle;
   the network interface hardware autonomously transmits the vehicle status signal to the network, wherein the vehicle status signal is associated with a pre-established user account on the network, the vehicle status signal further includes a source identifier that autonomously associates the vehicle status signal transmitted by the network interface hardware with the pre-established user account;
   the network interface hardware receives a vehicle performance signal from the network indicative of a driver performance ranking, wherein the driver performance ranking is based on the fuel consumption of the vehicle and the driver performance ranking is indicative of the fuel consumption of the vehicle relative to other vehicles in a pre-defined user group; and the network interface hardware receives an electronic marketing offer from the network, wherein the electronic marketing offer is transmitted to a number of vehicles that is less than the number of vehicles in the pre-defined user group and is based on the driver performance ranking of the vehicle relative to other vehicles in the pre-defined user group.

2. The vehicle of claim 1, wherein the pre-determined user group comprises at least one of:
vehicles having a same vehicle type;
vehicles having a same vehicle model;
vehicles having a same vehicle configuration; and
vehicles located within a pre-determined geographic region.

3. The vehicle of claim 1 further comprising an in-vehicle display communicatively coupled to the electronic control unit, wherein the electronic control unit transmits a display signal to the in-vehicle display such that the in-vehicle display displays the driver performance ranking.

4. The vehicle of claim 3, wherein the vehicle performance signal is indicative of the driver performance ranking of the vehicle as well as driver performance rankings for other vehicles in a pre-determined user group.

5. The vehicles of claim 4, wherein:
the vehicle further comprises an in-vehicle display communicatively coupled to the electronic control unit; and
when the instruction set is executed by the processor, the processor transmits a display signal to the in-vehicle display such that the in-vehicle display displays the driver performance ranking of the vehicle as well as the driver performance rankings for other vehicles in the pre-determined user group.

6. The vehicle of claim 3, wherein the in-vehicle display comprises a sync indicator that is illuminated when the network interface hardware is transmitting a vehicle status signal to the network and when the network interface hardware is receiving a vehicle performance signal from the network.

7. The vehicle of claim 1 further comprising a satellite navigation system receiver communicatively coupled to the electronic control unit, wherein the satellite navigation system receiver provides the electronic control unit with a position signal indicative of a location of the vehicle.

8. The vehicle of claim 7, wherein:
the vehicle status signal further comprises the location of the vehicle as determined from the position signal; and
the vehicle performance signal received from the network is indicative of the driver performance ranking of the vehicle based on fuel consumption of the vehicle relative to other vehicles within a pre-determined distance of the location of the vehicle.

9. The vehicle of claim 7, wherein:
the vehicle status signal further comprises the location of the vehicle as determined from the position signal; and
the vehicle performance signal received from the network is indicative of the driver performance ranking of the vehicle based on fuel consumption of the vehicle relative to other vehicles within a pre-determined geographic region with the vehicle.

10. The vehicle of claim 1, wherein the vehicle status signal further includes user account information that associates the vehicle status signal transmitted by the network interface hardware with the user account.

11. The vehicle of claim 1, wherein the network interface hardware transmits the driver performance ranking to a social media web portal.

12. A vehicle comprising a driver statistic system for interfacing with a network, the driver statistic system comprising:
at least one vehicle sensor for sensing a vehicle parameter;
an in-vehicle display;
network interface hardware for communicating with a network; and
an electronic control unit communicatively coupled to the vehicle sensor, the in-vehicle display, and the network interface hardware, wherein the electronic control unit comprises a processor and memory storing a computer readable and executable instruction set, wherein when the instruction set is executed by the processor:
the electronic control unit processes a sensor signal received from the vehicle sensor;
the electronic control unit transmits a vehicle status signal to the network interface hardware indicative of the vehicle parameter;
the network interface hardware autonomously transmits the vehicle status signal to the network, wherein the vehicle status signal is associated with a pre-established user account on the network, and the vehicle status signal further includes a source identifier that autonomously associates the vehicle status signal transmitted by the network interface hardware with the pre-established user account;
the network interface hardware receives a vehicle performance signal from the network, wherein the vehicle performance signal is indicative of a driver performance ranking based on the vehicle parameter and the driver performance ranking is indicative of the vehicle parameter relative to other vehicles in a pre-defined user group;
the network interface hardware receives an electronic marketing offer from the network, wherein the electronic marketing offer is transmitted to a number of vehicles that is less than the number of vehicles in the pre-defined user group and is based on the driver performance ranking of the vehicle relative to other vehicles in the pre-defined user group; and
the electronic control unit transmits a display signal to the in-vehicle display based on the vehicle performance signal received from the network such that the in-vehicle display displays the driver performance ranking.

13. The vehicle of claim 12, wherein the vehicle status signal is indicative of at least one of:
a fuel consumption of the vehicle;
an average speed of the vehicle;
a seat belt usage rate of occupants of the vehicle;
an average acceleration rate of the vehicle;
an average deceleration rate of the vehicle;
a carbon dioxide production of the vehicle;
average braking loads;
average steering loads;
average lateral vehicle loads;
average payload loads; and
average towing loads.

14. The vehicle of claim 12, wherein the pre-determined user group comprises at least one of:
vehicles having a same vehicle type;
vehicles having a same vehicle model;
vehicles having a same vehicle configuration; and
vehicles having located within a pre-determined geographic region.

15. The vehicle of claim 12, wherein the vehicle status signal further comprises vehicle performance and/or vehicle status data indicative of one or more of vehicle braking loads, steering loads, steering inputs, lateral vehicle loading, payload loads, towing loads, engine operation status, window open status, seat belt status, and turn signal usage rates.

16. The vehicle of claim 12 further comprising a satellite navigation system receiver communicatively coupled to the electronic control unit, wherein the satellite navigation system receiver provides the electronic control unit with a position signal indicative of a posted speed limit where the vehicle is operating, and the vehicle status signal is indicative of a speed of the vehicle and the posted speed limit to the network.

17. The vehicle of claim 12, wherein the vehicle status signal further includes user account information that associates the vehicle status signal transmitted by the network interface hardware with the user account.

18. A method for a vehicle to interface with a network, comprising:
   sensing at least one vehicle parameter with a vehicle sensor;
   transmitting a sensor signal from the vehicle sensor and receiving the sensor signal at an electronic control unit of the vehicle, wherein the sensor signal is indicative of the vehicle parameter;
   processing the sensor signal at the electronic control unit of the vehicle to produce a vehicle status signal;
   transmitting the vehicle status signal from the electronic control unit to network interface hardware;
   transmitting the vehicle status signal autonomously from the network interface hardware to the network, wherein the vehicle status signal is associated with a pre-established user account on the network and the vehicle status signal further includes a source identifier that autonomously associates the vehicle status signal transmitted by the network interface hardware with the pre-established user account;
   receiving a vehicle performance signal from the network at the network interface hardware of the vehicle, wherein the vehicle performance signal is indicative of driver performance ranking based on the vehicle parameter relative to other vehicles in a pre-defined user group;
   receiving an electronic marketing offer from the network at the network interface hardware, wherein the electronic marketing offer is transmitted to a number of vehicles that is less than the number of vehicles in the pre-defined user group and is based on the driver performance ranking of the vehicle relative to other vehicles in the pre-defined user group;
   transmitting the vehicle performance signal from the network interface hardware to the electronic control unit; and
   transmitting a display signal from the electronic control unit to a in-vehicle display, wherein the display signal is indicative of the driver performance ranking.

* * * * *